(12) United States Patent
Stein et al.

(10) Patent No.: US 6,300,400 B1
(45) Date of Patent: Oct. 9, 2001

(54) WALLBOARD ADHESIVE

(75) Inventors: Edward Stein, Newton; Steve Choi, Lexington, both of MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/061,653

(22) Filed: Apr. 17, 1998

Related U.S. Application Data

(60) Provisional application No. 60/044,650, filed on Apr. 18, 1997.

(51) Int. Cl.[7] ............................... C08J 5/10; C08K 3/26; C08L 31/04
(52) U.S. Cl. ..................... 524/425; 524/361; 524/297
(58) Field of Search ...................... 524/446, 425, 524/297, 296, 361, 362

(56) References Cited

U.S. PATENT DOCUMENTS

| | | | | |
|---|---|---|---|---|
| 3,866,383 | * | 2/1975 | Bernett | 52/744 |
| 3,967,016 | * | 6/1976 | Schneller et al. | 427/393 |
| 4,590,230 | * | 5/1986 | Kamada et al. | 524/77 |
| 5,102,462 | * | 4/1992 | Podlas | 106/181 |
| 5,458,723 | * | 10/1995 | Watkins et al. | 156/310 |

\* cited by examiner

*Primary Examiner*—James J. Seidleck
*Assistant Examiner*—U. K. Rajguru
(74) *Attorney, Agent, or Firm*—Pitney, Hardin, Kipp & Szuch LLP

(57) ABSTRACT

A water-based wallboard adhesive including water, a binder, and a particulate filler is described. The adhesive can have an open time greater than about 5 minutes and a green strength sufficient to support a 4 foot by 8 foot wallboard on a wall frame without fasteners in the field of the wallboard within 15 minutes of applying the adhesive to the wallboard and wall frame.

10 Claims, No Drawings

WALLBOARD ADHESIVE

CROSS REFERENCE TO RELATED APPLICATIONS

Under 35 USC §119(e)(1), this application claims the benefit of prior U.S. Provisional application Ser. No. 60/044,650 filed Apr. 18, 1997.

The invention relates to adhesives for use in construction.

BACKGROUND OF THE INVENTION

Adhesives are widely used in construction applications. For example, in the fabrication of wall systems (i.e., wallboard and wall frame assemblies), the industry typically constructs the wall frame on a horizontal work table and applies an adhesive to framing members of the wall frame. The adhesive is applied around the perimeter and in the "field" of the wall assembly. The field of the wallboard is the area within the perimeter of the wallboard. After application of the adhesive, 4 foot by 8 foot sections of wallboard (e.g., gypsum board) are placed onto the adhesive-coated framing members. The wall section is then raised to a vertical position for storage or use in constructing a house.

Fasteners (i.e., staples, screws, or nails) often are placed around the perimeter and in the field of the wallboard to provide additional strength to the assembly. By using fasteners, the wallboard and wall frame assembly can be raised almost immediately after the board is placed onto the adhesive on the framing member. The fasteners in the field in particular help avoid "wall pops." Wall pops occur because the wallboard and wall frame assembly may flex and distort when raised to a vertical position. Wall pops can cause the wallboard and wall frame assemblies to become loose and vibrate or rattle. If the wall pops are severe, wall repairs can be required.

The presence of fasteners in the field of the wallboard can cause various aesthetic problems. For example, the fastener has to be covered up by hand-applied overcoating, which requires additional manufacturing time and compromises the appearance of the finished wallboard and wall frame assembly.

The suitability of an adhesive for particular uses can be determined from the open time and green strength of the adhesive. "Open time" is the length of time that the adhesive is wet to the touch after applying the adhesive to a support. "Green strength" refers the load that the adhesive can bear at a particular time after application of the adhesive to a surface.

SUMMARY OF THE INVENTION

In one aspect, the invention features to a water-based adhesive including water, a binder, and a particulate filler. The adhesive has a green strength sufficient to support a 4 foot by 8 foot wallboard on a wall frame without fasteners in the field of the wallboard within 15 minutes, and preferably within 10 minutes, of applying the adhesive to the wallboard and wall frame.

For purposes of this application, green strength is determined by the shear strength test by the method described in AFG-01 "Adhesives for Field-Gluing Plywood to Wood Framing" (section 5; American Plywood Association), where a gypsum board is used in place of the plywood. In this method, a 2 inch by 2 inch section of plywood is bonded to the center of a 3 inch by 3 inch gypsum board with the adhesive. A loading rate of 0.2 inches per minute is applied to the board assembly. The strength is checked in time intervals (i.e., every 5 minutes). When the paper on the gypsum board tears, adequate green strength is achieved. A shear strength, according to this procedure, within 15 minutes of applying the adhesive to the wallboard and wall frame of between 5 and 15 pounds for the purpose of this application is sufficient to support a 4 foot by 8 foot wallboard on a wall frame without fasteners in the field of the wallboard.

The open time of the adhesive greater than 5 minutes, preferably greater than 10 minutes. For purposes of this application, open time is determined by measuring the percent of adhesive transference between two boards according to the method described in ASTM C-557, sections 4 and 6. In this method, a ⅜ inch bead of adhesive is placed on a 2 inch by 2 inch piece of plywood. The adhesive on the plywood is contacted to the surface of a 3 inch by 3 inch piece of gypsum board. The boards of are pulled apart at time intervals after application of the adhesive (i.e., every 5 minutes) to check transference of adhesive from the plywood to the gypsum board. Transference is measured as the area of adhesive transferred from one board to the other. The open time is the minimum time required to transfer about 60% of the adhesive from the plywood to the gypsum board.

In another aspect, the invention features a water-based adhesive including between 39 and 48 weight percent of a polyvinyl acetate emulsion, between 9 and 12 weight percent of a plasticizer, between 39 and 47 weight percent of a particulate filler having a first distribution and a second distribution of particle sizes, and between 0.5 and 1.2 weight percent of mineral spirits.

In another aspect, the invention features a wallboard and wall frame assembly including a wallboard and a wall frame bonded together by an adhesive. At the time the wallboard and wall frame were bonded by the adhesive, the adhesive includes water, a binder, and a particulate filler and has a green strength sufficient to support a 4 foot by 8 foot wallboard on a wall frame without fasteners in the field of the wallboard within 15 minutes of applying the adhesive to the wallboard and wall frame.

The binder may be, for example, a polyvinyl acetate emulsion, such as an aqueous homopolymer emulsion of a polyvinyl alcohol protected colloid having a solids content of about 55 percent.

The particulate filler may include two distributions of particle sizes. The first distribution has particle sizes between about 3 and 6 microns in diameter, and the second distribution has particle sizes between about 14 and 21 microns in diameter. The particulate filler may be, for example, a relatively unreactive solid, such as calcium carbonate.

The adhesive may include a thickener, such as a modified cellulose or a polyacrylic acid.

The preferred adhesive has a viscosity between about 60,000 and 70,000 cps.

The adhesive may include a plasticizer, mineral spirits, or a dispersant.

In another aspect, the invention features a method of manufacturing a wallboard and wall frame assembly. The method includes the steps of: (a) providing a wall frame and a wallboard; (b) applying the water-based adhesive described previously to a surface of the wall frame; and (c) placing a wallboard on the adhesive applied to the surface of the wall frame to produce a wallboard and wall frame assembly.

In preferred embodiments, the wall frame is provided in a horizontal position and the applying and placing steps are carried out in the horizontal position. The method can include the step of raising the wallboard and wall frame assembly to a vertical position within 15 minutes of applying the adhesive to the wallboard and wall frame. The method can also include the step of inserting fasteners around the perimeter of the wallboard before raising the wallboard and wall frame assembly.

The adhesive can lead to a reduction in the number of fasteners used in constructing a wallboard and wall frame assembly. Importantly, it is possible to reduce, and preferably eliminate, the use of fasteners in the field of the wallboard while maintaining a high rate of production. By reducing the number of fasteners used in the field, the need for cosmetic alterations can be reduced. The wallboard and wall frame assemblies can be moved rapidly (i.e., immediately) after gluing. Further, the adhesive holds the assembly together well during movement of the assembly, minimizing the occurrence of wall pops.

Other advantages and features of the invention will be apparent from the detailed description, and from the claims.

DETAILED DESCRIPTION

The preferred adhesive includes a binder, a particulate filler, a thickener, and a plasticizer. The adhesive is a high viscosity, water-based adhesive that can be used in the fabrication of wallboard and wall frame assemblies in the manufactured housing industry (i.e., in-plant home building). The adhesive has good open time and green strength characteristics for these applications.

The open time of the adhesive depends on the composition of the adhesive as well as environmental conditions (i.e., humidity). Open time is an important factor for obtaining good adherence of a board to a support, since it is important to make contact with the two surfaces being bonded by the adhesive before the adhesive forms a skin on the surface. Skin formation in aqueous adhesives is undesirable because the skin does not readily redissolve in the aqueous adhesive medium. A relatively long open time is desirable for building wallboard and wall frame assemblies. This facilitates applying the adhesive completely to the wall frame before placing the wallboard on the frame.

The green strength of the adhesive is an important factor in determining the suitability of the adhesive for use in the manufacture of wallboard and wall frame assemblies. The green strength provides a measure of the time that should pass before moving the surfaces being bonded by the adhesive to avoid failure of the bond. Green strength is related to the shear strength of the adhesive. Specifically, the green strength of the adhesive affects the manufacturing time of the assembly. It is important for the green strength of the adhesive to be high enough to support the wallboard on the wall frame in a relatively short amount of time. Preferably, adequate green strength is achieved within about 10 to 15 minutes of applying the adhesive.

The preferred binder is an aqueous polyvinyl acetate emulsion. The binder holds the filler particles together and binds the surfaces of the wallboard and wall frame together. The adhesive may contain, for example, between 37 and 50 weight percent, preferably between about 39.0 and 48.0 weight percent, of the polyvinyl acetate emulsion. The polyvinyl acetate can be a homopolymer. The solids content of the polyvinyl acetate emulsion can be about 55 weight percent. Suitable polyvinyl acetate emulsions include, for example Duroset 335/325 from National Starch Corporation, or Vinac 240/230 from Air Products.

The particulate filler used in the adhesive has two different distributions of particle sizes. A distribution is a particular range of particle sizes that 70 percent, preferably 80 percent, and more preferably 90 percent, of the particles within that distribution fall under. The two distributions of particle sizes are selected to minimize space between particles (i.e., dead volume) in the adhesive. Decreasing the space between particles tends to increase the green strength of the adhesive. Generally, each distribution is relatively narrow and the particle size of one distribution is larger than the other. A narrow distribution can have a 2 to 10 micron range of particle sized. For example, the particulate filler can include one distribution having particle sizes between about 3 and 6 microns in diameter and a second distribution having particle sizes between about 14 and 21 microns in diameter. The particulate filler is a relatively unreactive solid. One suitably unreactive solid that can be used is calcium carbonate. For example, the adhesive can contain between 20.70 and 25.30 weight percent calcium carbonate having diameters between 3 and 6 microns, and between 18.00 and 22.00 weight percent calcium carbonate having diameters between 14 and 21 microns.

The thickener helps modify the viscosity of the adhesive. When the viscosity is too high, the adhesive is difficult to apply and is not workable. When the viscosity is too low, the adhesive may have insufficient body and may be difficult to use. The adhesive preferably has a viscosity between 50,000 and 80,000 cps, more preferably between 55,000 and 75,000 cps, and most preferably between about 60,000 and 70,000 cps. The thickener can be, for example, a modified cellulose (i.e., hydroxyethylcellulose) or a polyacrylic acid. The adhesive may contain between 0.1 and 0.5 weight percent, preferably between 0.2 and 0.4 weight percent, and most preferably between 0.3 and 0.35 weight percent of a hydroxyethylcellulose thickener. The adhesive may contain between 0.6 and 1.4 weight percent, preferably between 0.8 and 1.2 weight percent, and most preferably between 0.9 and 1.1 weight percent of a polyacrylic acid thickener (e.g., Paragum 500 from Parachem). When a polyacrylic acid thickener is added to the adhesive, between 0.1 and 0.5 weight percent, preferably between 0.2 and 0.4 weight percent, and most preferably between 0.25 and 0.35 weight percent of aqueous ammonia is included in the adhesive.

The plasticizer can be, for example, an alkyl or aralkyl benzoate ester or an alkyl or aralkyl phthalate ester. The alkyl or aralkyl groups can be C1 to C8 groups. Preferred plasticizers include propylene glycol dibenzoate or benzyl phthalate. The adhesive can contain between 8 and 13 weight percent, preferably between 9 and 12 weight percent, and most preferably between 10 and 11 weight percent, of a benzoate ester.

The adhesive also may include other additives, such as mineral spirits, stabilizers, surfactants, preservatives, dispersants, and defoamers.

Mineral spirits increase the open time of the adhesive, which contributes to the workability of the adhesive. The adhesive may contain, for example, between 0.7 and 1.3 weight percent, and preferably 0.90 and 1.10 weight percent, mineral spirits.

The stabilizer provides the adhesive with freeze-thaw stability. One suitable stabilizer is ethylene glycol. The adhesive can contain between 0.5 and 1.0 weight percent, preferably 0.70 and 0.80 weight percent, of a stabilizer.

The surfactant can be, for example, a non-ionic surfactant, such as an alkylphenol-ethylene oxide condensate (e.g., octylphenoxy-ethylene oxide condensate, Triton X405, available from Rhom & Hass). The adhesive may contain, for example, between 0.2 and 0.5 weight percent, preferably between 0.35 and 0.40 weight percent, of the non-ionic surfactant.

The preservative inhibits growth of algae, fungi, or bacteria. The adhesive may contain, for example, between 0.02 and 0.07 weight percent, preferably between 0.03 and 0.04 weight percent of an organic preservative.

Examples of suitable dispersants include aromatic sulfonic acids (sodium salt) (e.g., Tamol 850, Rhom & Hass), polycarboxylic acids, or inorganic polyphosphates. The amount of dispersant included in the adhesive will vary depending on the dispersant or combination of dispersants used in the adhesive. The adhesive may include, for example, between 0.05 and 0.5 weight percent of dispersant. For example, the adhesive may contain between 0.07 and 0.09 weight percent of the aromatic sulfonic acid, sodium salt and between 0.35 and 0.40 weight percent of an inorganic polyphosphate.

A defoamer can facilitate mixing by reducing bubbling and foaming. Suitable defoamers include Foamblast 301S, available from Ross Chemical. The adhesive may include, for example, between 0.02 and 0.1 weight percent of defoamer.

The components of the adhesive product can be mixed in many different types of mixers, provided that high shear mixing can be accomplished. It is important that the components of the adhesive be homogeneously mixed in order to avoid formation of pockets of unmixed material in the adhesive. Pockets of unmixed material can be avoided by slowly adding the components to the binder emulsion. This can also decrease the amount of mixing time required to achieve the desired homogeneity. For example, the components can be mixed in a mixer equipped with a high speed disperser blade and a wiper blade that scrapes material from the inner wall of the mixer.

The following are specific examples of the composition and manufacture of the adhesive.

EXAMPLE 1

An adhesive having the composition shown in Table I was mixed in a high shear mixer (Hockmeyer Equipment Model #HHL 11-480), which was equipped with a high speed disperser blade and a wiper blade. The polyvinyl acetate emulsion (Duroset 335/325, 55% solids) was weighed into the mixing vessel. The remaining ingredients were added while the high shear blade was turning. The modified cellulose (hydroxyethylcellulose, Natrosol 250H Aqualon Co.) was slowly sifted into the mixing vessel. The defoamer (Foamblast 301S, Ross Chemical), propylene glycol dibenzoate ester (Benzoflex 9-88, Velsicol), octylphenol-ethylene oxide condensate (Triton X405, Rhom & Hass), aromatic sulfonic acid, sodium salt (Tamol 850, Rhom & Hass), ethylene glycol, inorganic polyphosphate (Composition T, Calgon), and an organic preservative (hydroxymethoxymethyldioxa-bicyclooctane, Nuosept 95, HULS America Inc.) were then added with no special precautions used. After blending for about 5 minutes, the calcium carbonate fillers were added at a moderate rate of speed. Mineral spirits were then added. The adhesive was mixed for a couple of hours until smooth.

TABLE I

| Ingredient | Function | Weiqht % |
|---|---|---|
| Polyvinyl Acetate Emulsion | Binder | 43.67 |
| Modified Cellulose | Thickener | 0.30 |
| — | Defoamer | 0.03 |
| Benzoate Ester | Plasticizer | 10.50 |

TABLE I-continued

| Ingredient | Function | Weiqht % |
|---|---|---|
| Alkylphenol - Ethylene Oxide Condensate | Surfactant | 0.35 |
| Aromatic Sulfonic Acid, Sodium Salt | Dispersant | 0.07 |
| Ethylene Glycol | Stabilizer | 0.70 |
| Inorganic Polyphosphate | Dispersant | 0.35 |
| Organic | Preservative | 0.03 |
| Calcium Carbonate (3–6 micron diameter) | Filler | 23.00 |
| Calcium Carbonate (14–21 micron diameter) | Filler | 20.00 |
| Mineral Spirits | | 1.00 |
| | | 100.00 |

The adhesive had a solids content between 77 and 79 weight percent, a density of 12.2 pounds per gallon, and a viscosity between 60,000 and 70,000 cps. The adhesive had an open time between 5 and 10 minutes, which was determined by the method described in ASTM C-557, sections 4 and 6. The green strength was determined from the shear strength test of AFG-01 (section 5) test, where gypsum board was used instead of plywood. The results of the shear strength test are summarized in Table II. The shear strength after 15 minutes of applying the adhesive to the wallboard and wall frame of between 5 and 15 pounds was sufficient to support a 4 foot by 8 foot wallboard on a wall frame without fasteners in the field of the wallboard.

TABLE II

| Dry Time (minutes) | Shear Strength Range (1b) |
|---|---|
| 10 | 2.5–12 |
| 15 | 5–15 |
| 20 | 11–12.5 |
| 60 | 32–35 |

EXAMPLE 2

An adhesive having the composition shown in Table III was prepared as described in Example 1.

TABLE III

| Inqredient | Function | Weiqht % |
|---|---|---|
| Polyvinyl Acetate Emulsion | Binder | 45.17 |
| Modified Cellulose | Thickener | 0.30 |
| — | Defoamer | 0.03 |
| Benzoate Ester | Plasticizer | 10.50 |
| Alkylphenol - Ethylene Oxide Condensate | Surfactant | 0.35 |
| Aromatic Sulfonic Acid, Sodium Salt | Dispersant | 0.07 |
| Ethylene Glycol | Stabilizer | 0.70 |
| Inorganic Polyphosphate | Dispersant | 0.35 |
| Organic | Preservative | 0.03 |
| Calcium Carbonate (3–6 micron diameter) | Filler | 23.00 |
| Calcium Carbonate (14–21 micron diameter) | Filler | 20.00 |
| Mineral Spirits | | 1.00 |

The adhesive had a viscosity between about 50,000 and 60,000 cps, had an open time between 5 and 10 minutes, and a green strength sufficient to support a 4 foot by 8 foot wallboard on a wall frame without fasteners in the field of the wallboard within 15 minutes of applying the adhesive to the wallboard and wall frame.

EXAMPLE 3

The adhesive was used to bond a wallboard to a wall frame. The adhesive was applied to the wall frame as a ⅜ inch bead. Within 10 minutes, the wallboard was contacted to the adhesive to form the bond. Fasteners were placed around the perimeter of the wallboard and wall frame assembly.

The adhesive can be applied using a standard 29-ounce "caulk-type" cartridge for use with standard or pneumatic caulk guns. The adhesive can also be applied from a 55 gallon drum by a pumping system (GRACO, for example) which delivers sufficient pressure to move the adhesive through long hoses to get to the application site. With the pumping system a "wand" applicator is used to apply the adhesive. The desired viscosity of the adhesive for applications by these methods is between about 50,000 and 80,000 cps, preferably between 55,000 and 75,000 cps, and most preferably between 60,000 and 70,000 cps. The thickness of adhesive applied is generally between ¼ inch and ½ inch (e.g., ⅜ inch bead).

Other embodiments are within the claims. For example, the adhesive can be used to construct wallboard and wall frame assemblies in a vertical position.

What is claimed is:

1. A water base adhesive comprising water, a binder and a particulate filler and having a green strength sufficient to support a 4 foot by 8 foot wallboard on a wall frame without fasteners in the field of the wallboard within 15 minutes of applying the adhesive to the wallboard and wall frame, wherein said adhesive further having an open time of greater than 5 minutes, wherein said binder is a polyvinyl acetate emulsion, and wherein said particulate filler comprises a first particle size distribution and a second particle size distribution.

2. The adhesive of claim 1, wherein the particulate filler is calcium carbonate.

3. The adhesive of claim 1, further comprising a thickener.

4. The adhesive of claim 1, further comprising a plasticizer.

5. The adhesive of claim 1, further comprising mineral spirits.

6. A water based adhesive comprising between 39 and 48 weight percent polyvinyl acetate emulsion, between 9 and 2 weight percent of a plasticizer, between 39 and 47 weight percent of a particulate filler comprising a first distribution and a second distribution of particle sizes, and between 0.5 and 1.2 weight percent of mineral spirits, wherein said adhesive composition further has an open time greater than about 5 minutes and a green strength sufficient to support a 4 foot by 8 foot wallboard on a wall frame without fasteners in the field of the wallboard within 15 minutes of applying the adhesive to the wallboard and wall frame.

7. The adhesive of claim 6, wherein the particulate filler is calcium carbonate and the first distribution has particle sizes between about 3 and 6 microns in diameter and the second distribution has particle sizes between about 14 and 21 microns in diameter.

8. The adhesive of claim 6, further comprising between 0.25 and 0.5 weight percent of a modified cellulose.

9. The adhesive of claim 6, further comprising between 0.6 and 1.4 weight percent of a polyacrylic acid.

10. The adhesive of claim 6, further comprising a stabilizer, a non-ionic surfactant, and a dispersant.

\* \* \* \* \*